US012627531B2

(12) United States Patent
    Guerena

(10) Patent No.:    US 12,627,531 B2
(45) Date of Patent:        May 12, 2026

(54) SELECTING A SIGNAL PHASE IN A COMMUNICATION SYSTEM

(71) Applicant: NantWorks, LLC, Culver City, CA (US)

(72) Inventor: Thomas Guerena, Rancho Santa Margarita, CA (US)

(73) Assignee: NantWorks, LLC, Culver City, CA (US)

( * ) Notice:    Subject to any disclaimer, the term of this patent is extended or adjusted under 35 U.S.C. 154(b) by 353 days.

(21) Appl. No.: 18/235,487

(22) Filed:    Aug. 18, 2023

(65)            Prior Publication Data

US 2024/0007331 A1        Jan. 4, 2024

Related U.S. Application Data

(63) Continuation of application No. 17/204,738, filed on Mar. 17, 2021, now Pat. No. 11,777,763.

(60) Provisional application No. 62/992,670, filed on Mar. 20, 2020.

(51) Int. Cl.
    *H04L 25/02*        (2006.01)
    *H04L 25/03*        (2006.01)
(52) U.S. Cl.
    CPC ...... *H04L 25/0212* (2013.01); *H04L 25/0204* (2013.01); *H04L 25/03974* (2013.01)
(58) Field of Classification Search
    None
    See application file for complete search history.

(56)            References Cited

U.S. PATENT DOCUMENTS

| | | | | |
|---|---|---|---|---|
| 5,319,735 | A | * | 6/1994 | Preuss ................... H04B 1/707 |
| | | | | 704/E19.009 |
| 5,963,898 | A | * | 10/1999 | Navarro ................. G10L 19/10 |
| | | | | 704/219 |
| 6,314,148 | B1 | | 11/2001 | Fulghum |
| 6,952,570 | B2 | * | 10/2005 | Nagayasu ........... H04L 27/0014 |
| | | | | 455/208 |
| 7,274,763 | B2 | | 9/2007 | Hammes et al. |
| 7,701,374 | B2 | | 4/2010 | Pala |
| 8,264,607 | B2 | | 9/2012 | Chen et al. |
| 8,929,497 | B2 | | 1/2015 | Chmelar et al. |
| 9,112,742 | B2 | | 8/2015 | Ali Shah et al. |
| 9,635,515 | B1 | * | 4/2017 | Ahirwar ................. G01S 13/76 |

(Continued)

FOREIGN PATENT DOCUMENTS

| | | | | | |
|---|---|---|---|---|---|
| KR | 20100065077 | A | * | 6/2010 | ......... H04W 56/004 |
| WO | WO-2007059517 | A2 | * | 5/2007 | ........... H04B 7/0634 |

*Primary Examiner* — Andrew C Oh
(74) *Attorney, Agent, or Firm* — Harness Dickey & Pierce P.L.C.

(57)            ABSTRACT

In some aspects, there is provided a method. The method may include estimating, based on a first signal-phase in a plurality of signal-phases associated with an input signal, a first channel impulse response; estimating, based on a second signal-phase in the plurality of signal-phases, a second channel impulse response; selecting, based on at least one characteristic of the estimated first channel impulse response and the estimated second channel impulse response, a signal-phase from the plurality of signal-phases; equalizing, based on the selected signal phase, the input signal to produce an equalized signal; and outputting, to a symbol detector, the equalized signal. Related systems, methods, and articles of manufacture are also disclosed.

20 Claims, 15 Drawing Sheets

(56)                    References Cited

U.S. PATENT DOCUMENTS

| | | | | |
|---|---|---|---|---|
| 11,329,848 B2 * | 5/2022 | Kons | ..................... | H04L 5/0048 |
| 2003/0086508 A1 * | 5/2003 | Magee | ................ | H04L 27/0014 |
| | | | | 375/340 |
| 2006/0146866 A1 * | 7/2006 | Horvath | ................... | H04B 3/54 |
| | | | | 370/464 |
| 2007/0053462 A1 * | 3/2007 | Pirooz | ................. | H04L 27/2675 |
| | | | | 375/285 |
| 2010/0220808 A1 * | 9/2010 | Kishigami | .......... | H04L 25/0232 |
| | | | | 375/295 |
| 2011/0228837 A1 * | 9/2011 | Nentwig | ............. | H04L 25/0204 |
| | | | | 375/232 |
| 2014/0079110 A1 * | 3/2014 | Rathi | ................ | H04L 25/03044 |
| | | | | 375/231 |
| 2015/0124913 A1 * | 5/2015 | Kuo | .................... | H04L 25/0228 |
| | | | | 375/343 |
| 2017/0346662 A1 * | 11/2017 | Beukema | .......... | H04L 25/03878 |
| 2019/0208463 A1 * | 7/2019 | Lou | ....................... | H04W 48/12 |

* cited by examiner $f_s$ = ADC sample rate, 1/T = baud rate 100

107

$f_s$          (M/N)$f_s$ ←117          1/T          122

105          113          119          131          129          135

103          ADC x[l]          FILTER y[m]          TIME/FREQ OFFSET COMP          r[m]          CIR EST/GEN          h[n]          SSE/ COEFF GEN          s[n]

ADC 101          FILTER 111          115          121          r'[n]          135 clock          select_0          frequency offset estimate          control_0          CIR characteristics          133

109          125          124 phase selection logic 123          control_1

127          137

150

| SYNC | CE | HEADER | PAYLOAD |
|---|---|---|---|
| 151 | 153 | 155 | 157 |

800

SELECTING A SIGNAL PHASE IN A COMMUNICATION SYSTEM

CROSS-REFERENCE TO RELATED APPLICATIONS

This application is a continuation of U.S. patent application Ser. No. 17/204,738, filed Mar. 17, 2021, which claims the benefit of U.S. Provisional Patent Application No. 62/992,670, filed Mar. 20, 2020. The disclosures of each of the above applications are incorporated by reference herein in their entireties.

FIELD

The subject matter described herein relates generally to communication systems and, more specifically, to selecting a signal phase.

BACKGROUND

A communication device may include one or more systems, including circuitries and software, for receiving and processing an analog signal (e.g., a baseband signal.) A signal processing system may apply one or more analog-to-digital conversion techniques to convert the analog signal to digital samples. Moreover, the signal processing system may determine and select a signal phase and estimate a channel impulse response for equalization.

SUMMARY

In certain aspects of the current subject matter, challenges associated with the performance of a symbol-spaced equalizer may be addressed by the inclusion of one or more features described herein or comparable/equivalent approaches as would be understood by one of ordinary skill in the art. Aspects of the current subject matter relate to apparatuses, methods, and systems for generating and selecting a signal phase.

In some aspects, there is provided a method. The method may include estimating, based on a first signal-phase in a plurality of signal-phases associated with an input signal, a first channel impulse response; estimating, based on a second signal-phase in the plurality of signal-phases, a second channel impulse response; selecting, based on at least one characteristic of the estimated first channel impulse response and the estimated second channel impulse response, a signal-phase from the plurality of signal-phases; equalizing, based on the selected signal phase, the input signal to produce an equalized signal; and outputting, to a symbol detector, the equalized symbol.

In some variations, one or more of the features disclosed herein including the following features may optionally be included in any feasible combination. The first channel impulse response estimate and the second channel impulse response estimate may each be a time-domain estimate. The first channel impulse response estimate may include a first sequence of values, and the second channel impulse response estimate may include a second sequence of values. The at least one characteristic of the first channel impulse response estimate may include a first maximum value of the first sequence of values, and the at least one characteristic of the second channel impulse response estimate may include a second maximum value of the second sequence of values. The method may include selecting the second signal-phase as the signal-phase based on the second maximum value being greater than the first maximum value. The method may include selecting the first signal-phase as the signal-phase based on the first maximum value being equal to or greater than the second maximum value. The plurality of signal-phases may be based on a product of an oversampling factor and an up-sampling factor, and wherein the product is an integer value greater than 2. Each value in the first sequence of values may be associated with a first sequence time index, and each value in the second sequence of values may be associated with a second sequence time index. The method may include determining a first set of threshold values based on the first maximum value being equal to or greater than the second maximum value. The method may include determining a second set of threshold values based on the first maximum value being less than the second maximum value. The method may include selecting at least one of the first signal-phase, the second signal-phase, and an intermediate signal-phase from the plurality of signal-phases, wherein the selection is based on the first maximum value, the second maximum value, the first sequence time index, the second sequence time index, and at least of the first set of threshold values and the second set of threshold values. The first set of threshold values and/or the second set of threshold values may include at least one of a set of fixed values, a set of programmable values, and a set of threshold values based on at least one of the first maximum value and the second maximum value. The selected signal-phase may correspond to one of the plurality of signal-phases having the oversampling factor being at least 3 and the up-sampling factor being 1. The selected signal-phase may correspond to one of a plurality of interpolated signal-phases. The method may include estimating a third channel impulse response based on an intermediate signal-phase selected as the signal-phase. The third channel impulse response may be estimated based on the first channel impulse response estimate and the second channel impulse response estimate. The method may include generating an interpolated sequence of values based on a first portion of the first channel impulse response estimate and a second portion of the second channel impulse response estimate, wherein the first portion and the second portion are based on at least one of the first maximum value, the second maximum value, the first sequence time index, and the second sequence time index; selecting the signal-phase based on a third maximum value of the interpolated sequence of values; and generating a third channel impulse response estimate by down-sampling, based on the third maximum value, the interpolated sequence of values.

Implementations of the current subject matter may include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer-implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to selecting a signal phase, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 12 depicts a block diagram illustrating a computing system consistent with some implementations of the current subject matter.

When practical, similar reference numbers denote similar structures, features, or elements.

DETAILED DESCRIPTION

A communication device (e.g., a wireless device) may include a receiver and a signal processing system for receiving and processing communication network signals. The signal processing system may include an equalizer to compensate for multipath characteristics and/or other signal degradations caused by a communication channel and/or components (e.g., filters, converters, etc.) in the communication device. The equalizer may output an equalized signal to one or more downstream signal processing stages, which may include a symbol detector, an error detection stage, and/or the like. The equalizer may be implemented in a time or frequency domain and may be linear, non-linear, a maximum likelihood sequence, and the like. Moreover, equalizers may be of different types such as symbol-spaced or fractionally-spaced. A symbol-spaced equalizer may use a single sample per symbol (e.g., a sampling rate of 1/T), whereas a fractionally-spaced equalizer may use two or more samples per symbol (e.g., a sampling rate of 2/T.) The performance of the receiver may be degraded if a sub-optimal sample phase is used in the symbol-spaced equalizer. By using multiple samples, a fractionally-spaced equalizer may overcome signal sampling phase errors and provide a better error rate performance than a symbol-spaced equalizer. However, a fractionally-spaced equalizer may require a larger and more complex circuitry, which may have a power consumption higher than that of a symbol-spaced equalizer. Therefore, there is a need to select a signal phase that minimizes power consumption and improves the performance of a receiver that implements a symbol-spaced equalizer.

Figure 1:
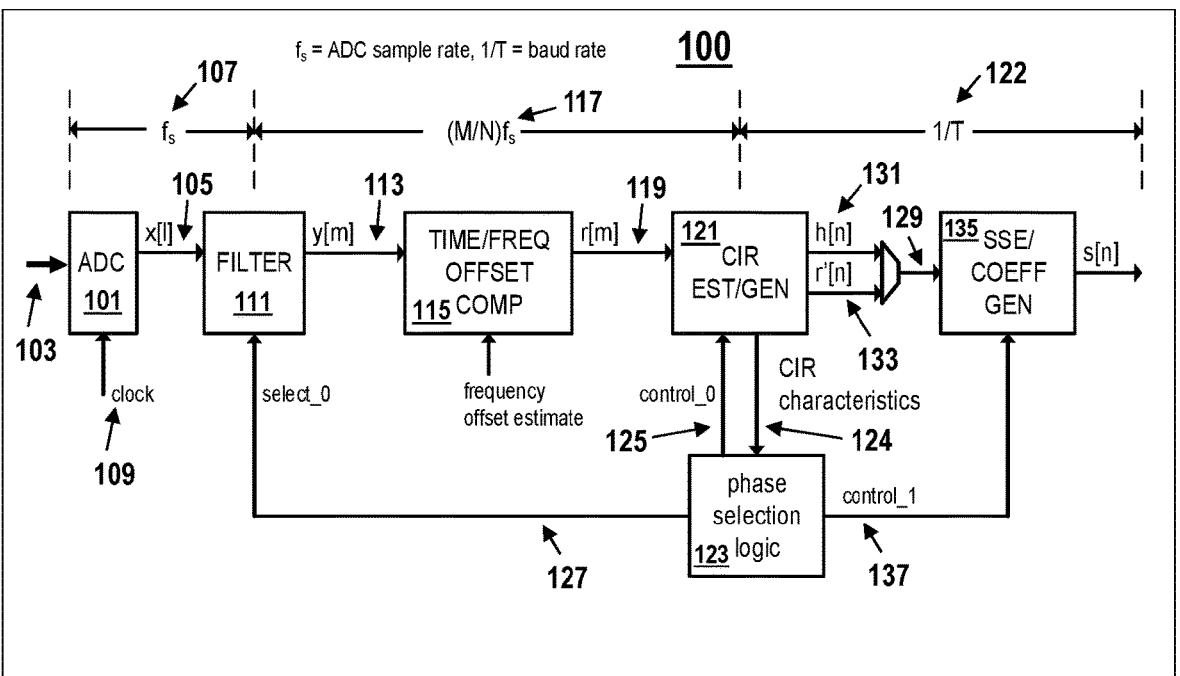
FIG. 1 depicts a signal processing system of a communication device and a communication network data packet, in accordance with some example embodiments.

FIG. 1 depicts a signal processing system 100 of a communication device and a communication network data packet 150, in accordance with some example embodiments. The system 100 may include an analog-to-digital converter (ADC) 101 for sampling an analog input signal 103 (e.g., an analog baseband signal), which may provide a data stream including one or more data packets 150. The data packet 150 may include data in a synchronization field 151, a channel estimation field 153, a header field 155, and a payload field 157. In some example embodiments, the synchronization field 151 may be utilized to determine an automatic gain control, data packet acquisition, frequency offset estimation, signal to noise estimation, and a symbol alignment. By sampling the analog input signal 103, the ADC 101 may generate a signal 105 including digital samples representative of the analog input signal 103. In some example embodiments, the ADC 101 may operate at a sampling rate 107, $f_s$, which may be based on a frequency of a sampling clock signal 109. For example, the sampling rate 107 may be 1.5 times a receiver baud rate, 1/T, of the communication device. In some example embodiments, the sampling clock signal 109 may produce a digital sample rate, which may be higher than the receiver baud rate, for example, by an oversampling factor (e.g., ADC sample rate=sampling clock rate=baud rate times oversampling factor). Other ADC sampling clock schemes may provide the same or similar oversampling factors, for example, where the oversampling factor may be relative to the communication system's baud rate. In some example embodiments, an ADC may capture samples on both edges (e.g., rising and falling edges) of the sampling clock signal and produce an oversampling factor such that the sampling clock signal may be at one-half the rate of a sampling clock of an ADC capturing samples only on a single edge (e.g., rising edge.). In some example embodiments, a communication system may use quadrature signals where two ADC's may operate in parallel such that one ADC may convert an in-phase signal and a second ADC may convert the quadrature signal. In some example embodiments, the signals discussed in relation to FIG. 1 may be quadrature signals.

The system 100 may also include a filter 111 to provide, for example, adaptive sampling rates for up-sampling, interpolation, and/or down-sampling of the digital samples 105 received from the ADC 101. In some example embodiments, the filter 111 may perform some operations at the sampling rate 107, whereas other operations may be performed at a sample rate 117, $[(M/N)f_s]$, where M may be an integer value indicating an up-sampling factor, and N may be an integer value indicating a down-sampling factor. In some example embodiments, the M and/or N integer values may be selected such that the filter 111 may provide a signal 113 with a desired number of signal phases. In some example embodiments, the filter 111 may be configured to provide a signal 113 having different characteristics. For example, a phase selection logic 123 may provide to the filter 111 a control signal 127 (e.g., a multibit signal) requesting for the filter 111 to provide a different signal 113. The request may be for the filter 111 to output a signal 113, which is shifted in time (e.g., by ⅙ of the symbol period) and/or provides one or more specific signal phases, for example, phase-0 and phase-1.

Figure 2:
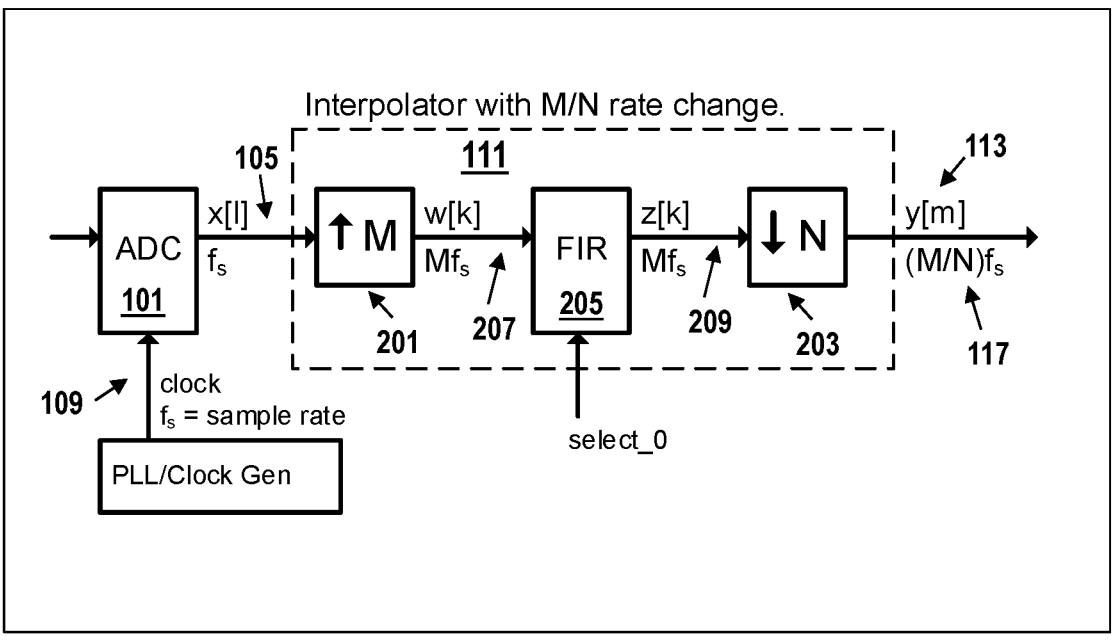
FIG. 2 depicts elements of the signal processing system including a filter, in accordance with some example embodiments.

FIG. 2 depicts elements of the signal processing system 100 including the filter 111, in accordance with some example embodiments. In some embodiments, the sampling rate 117 $[(M/N)fs]$ at the output of the filter 111 may be based on the up-sampling factor, M, of an up-sampling block 201 and the down-sampling factor, N, of a down-sampling block 203. In some example embodiments, the sampling clock signal 109 may be configured with an oversampling factor of 1.5, the filter 111 may be configured with an up-sampling factor of M=2 and a down-sampling factor of N=3 such that a ratio of the up-sampling and down-sampling is ⅔ (e.g., M/N). In some embodiments, a finite impulse response (FIR) filter 205 may receive the digital samples in signal 207 from the up-sampling block 201, filter the samples, and output signal 209 to the down-sampling block 203. In some example embodiments, the up-sampling block 201, FIR filter 205, and the down-sampling block 203 may be integrated to provide, for example, a more efficient hardware implementation. Alternatively and/or additionally, the filter 111 may include an infinite impulse response filter.

Figure 3:
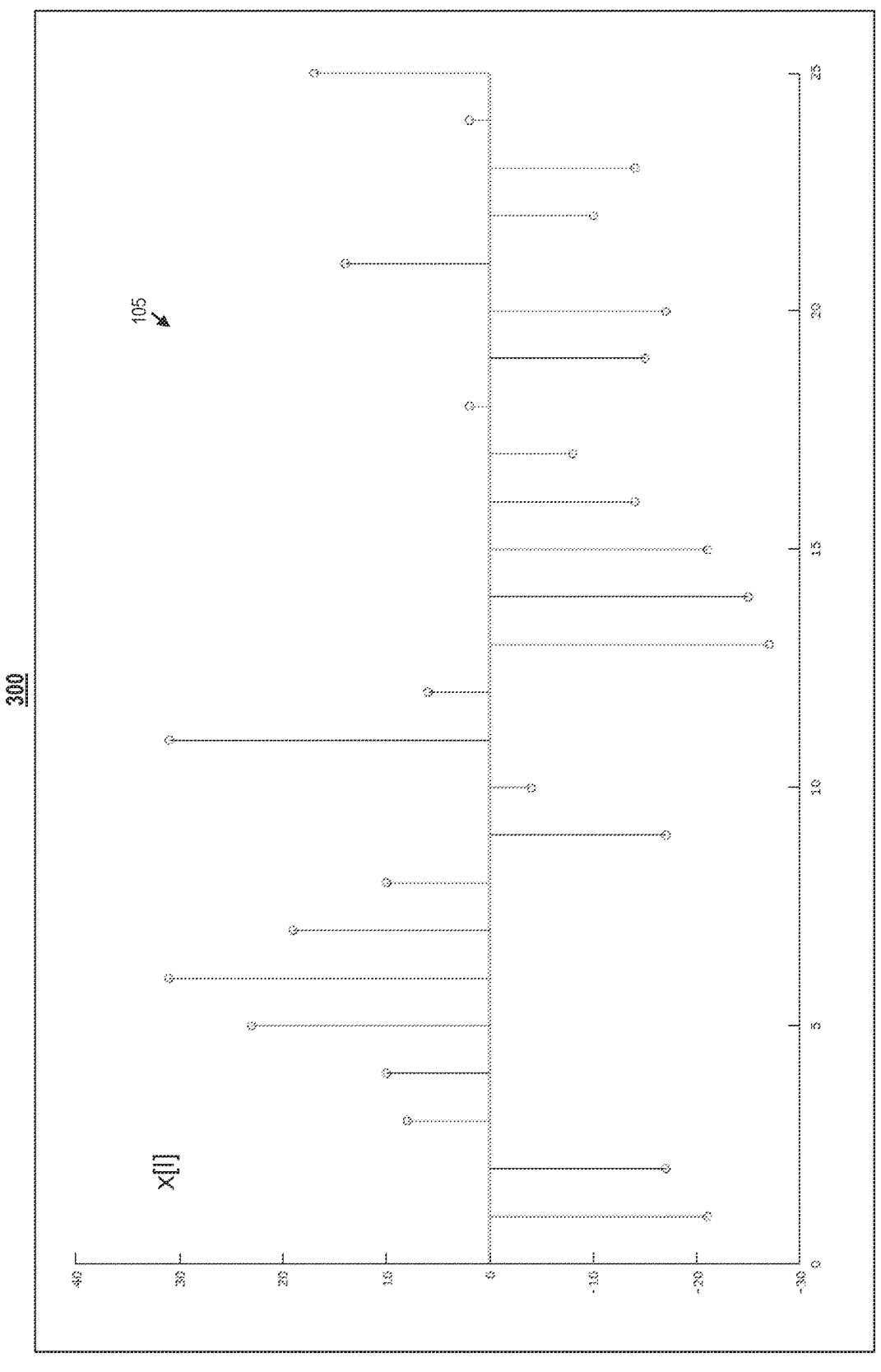
FIG. 3 depicts plots of digital samples generated by the signal processing system, in accordance with some example embodiments.
Figure 3:
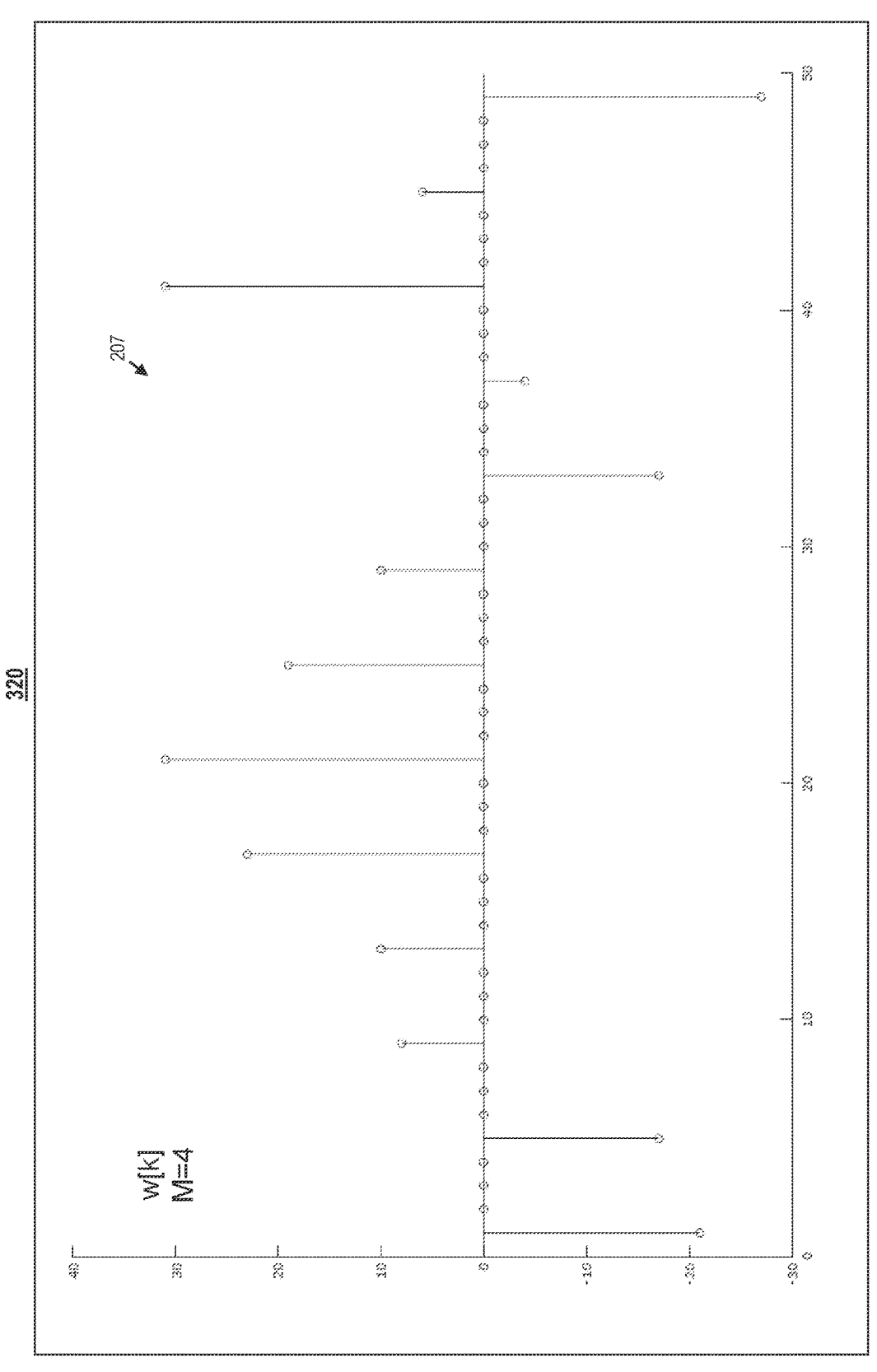
Figure 3:
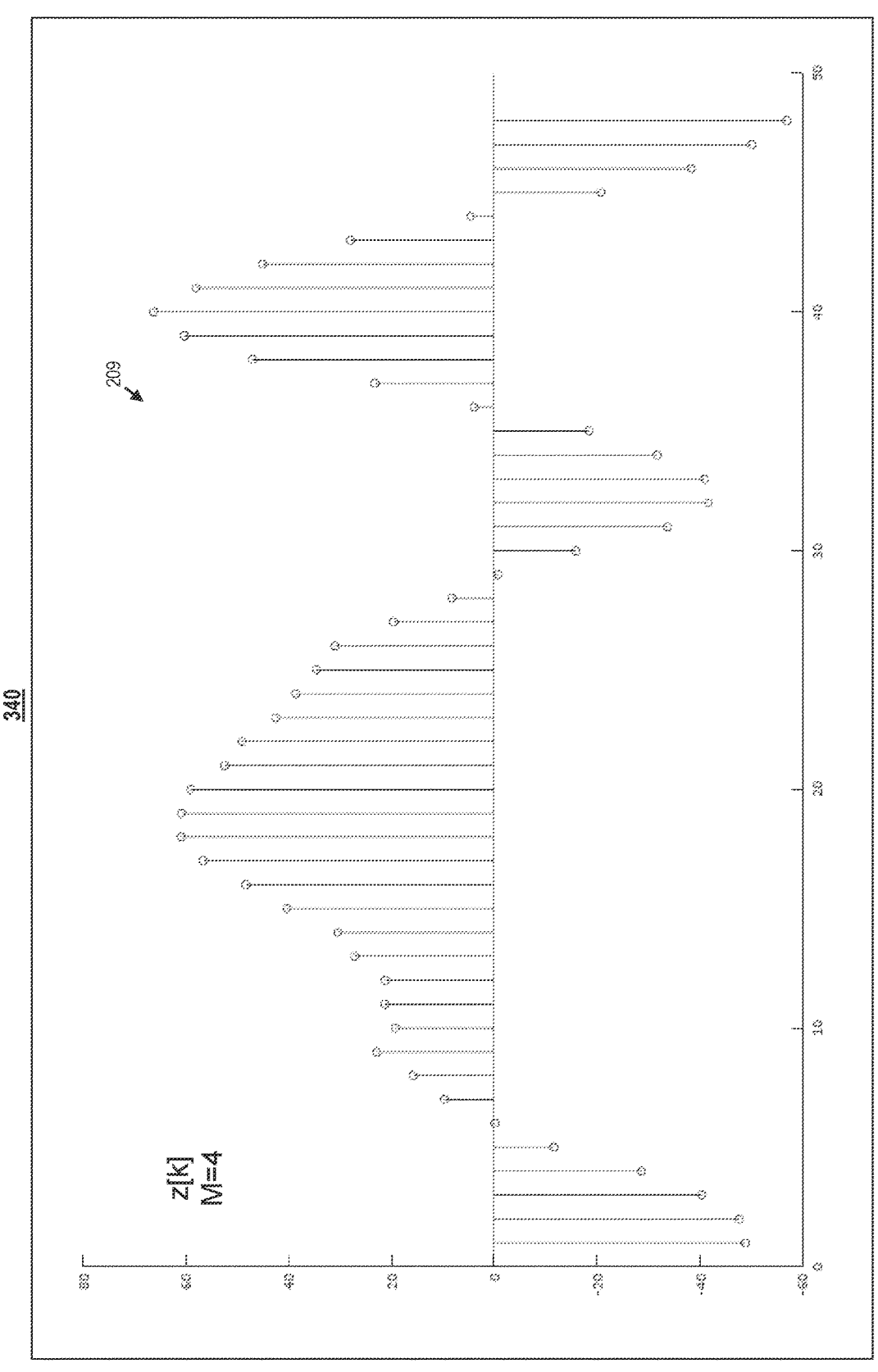

FIG. 3 depicts plots 300, 320, and 340 of digital samples generated by the signal processing system 100, in accordance with some example embodiments. Diagram 300 illustrates a signal set x[1], which is a representation of the digital samples in the signal 105 provided by the ADC 101. Referring to diagram 320, when M=4, a signal set w[k] represents the up-sampling signals 207 output by the up-sampling block 201. Referring to diagram 340, when M=4, a signal set z[k] represents the finite impulse response output signal 209 provided to the down-sampling block 203.

Figure 4:
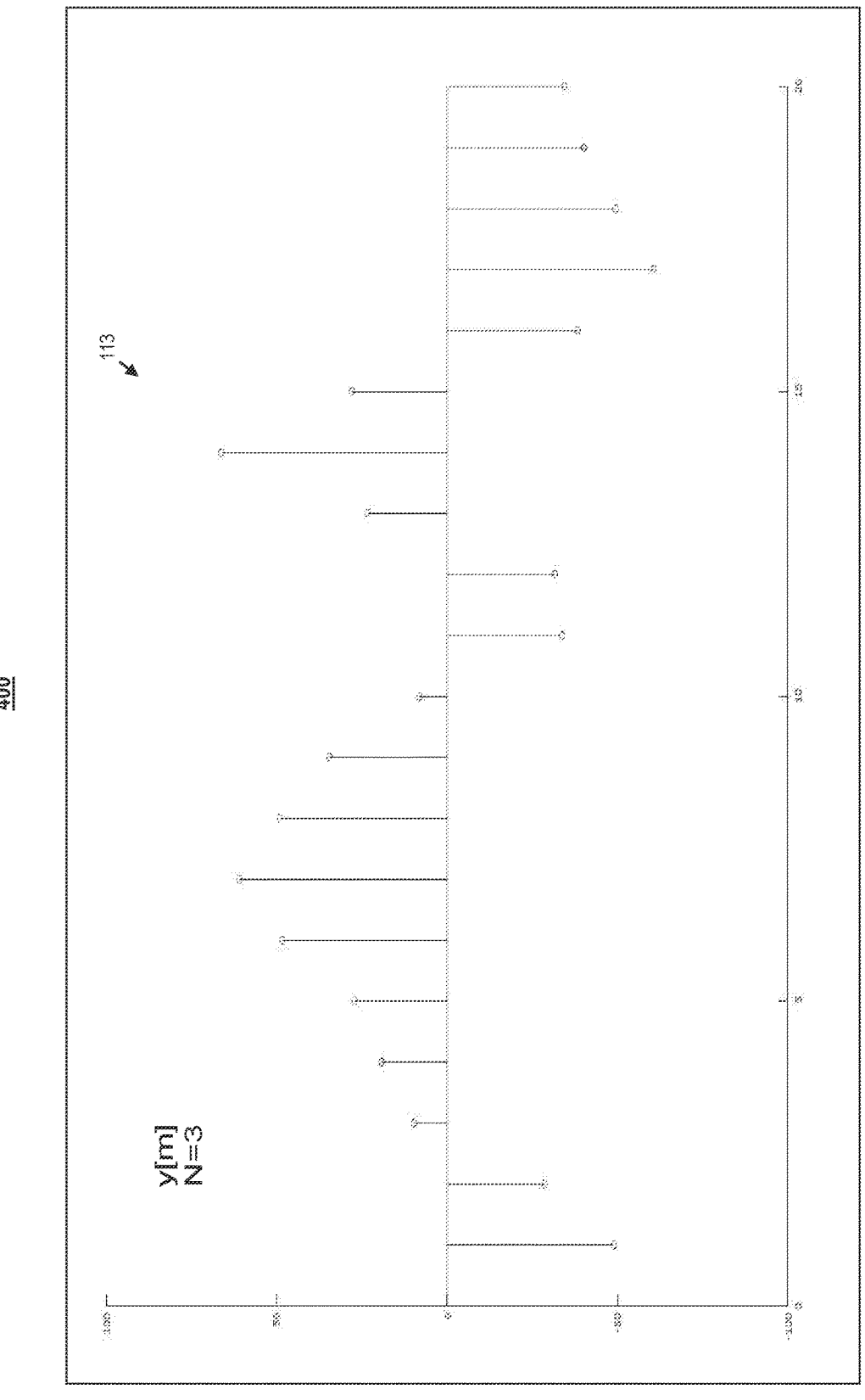
FIG. 4 depicts plots of output signals of the filter, in accordance with some example embodiments.
Figure 4:
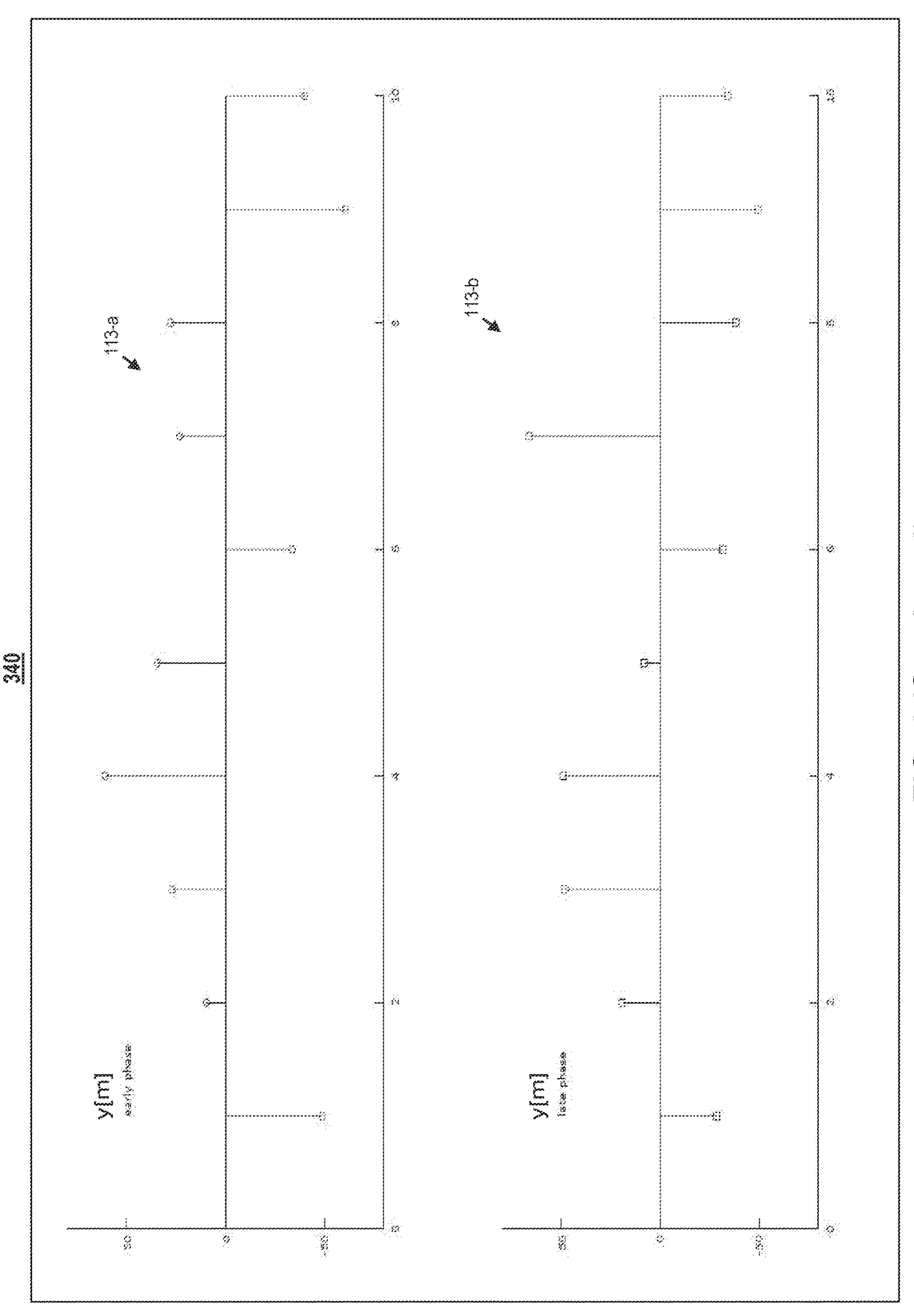

FIG. 4 depicts plots 400 and 450 of output signals of the filter 111, in accordance with some example embodiments. Diagram 400 illustrates a representation of the output signal 113 of the filter 111, where a down-sampling value of N=3 may result in a two-time oversampled output signal 113 having two signal phases. The oversampling may be with respect to the symbol rate (e.g., a baud rate, 1/T) of a receiver associated with the system 100. Diagram 450 illustrates the output signal 113 in different phases, for example, signal 113-*a* may be associated with an early phase (e.g., phase-1) whereas a signal 113-*b* may be associated with a late phase (e.g., phase-3).

Referring to FIG. 1, in some example embodiments, a time-frequency offset compensator 115 may apply a correction to the signal 113 received from the filter 111. The correction may be to compensate for a frequency offset between the sampling clock signal 109 and a transmitter of a wireless signal associated with the input signal 103. For example, the correction may include adjustment to a timing or frequency of the signal 113 received from the filter 111. The time-frequency offset compensator 115 may provide an adjusted signal 119 to a channel impulse response (CIR) estimator-generator 121. In some example embodiments, the CIR estimator-generator 121 may receive the signal 119, which may include channel-estimation data 153 in the data packet 150. The CIR estimator-generator 121, based on the channel-estimation field 153, may generate a OR estimate including a plurality of sequences such that each sequence may be associated with a different signal phase. The CIR estimates may be in the time domain or frequency domain.

Figure 5:
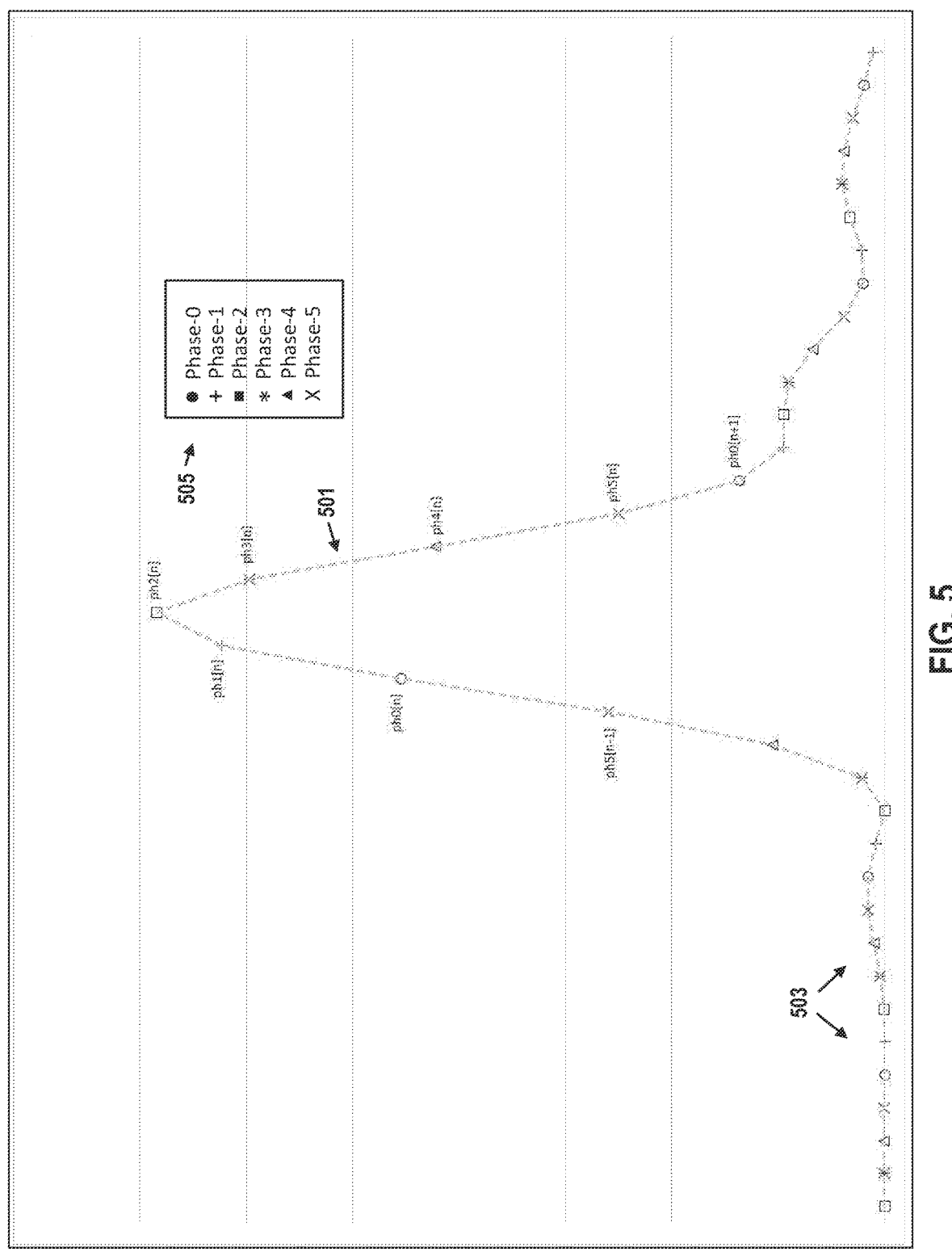
FIG. 5 depicts a plot of channel impulse response estimated sequences and signal-phases, in accordance with some example embodiments.

FIG. 5 depicts a plot of channel impulse response estimated sequences and signal phases, in accordance with some example embodiments. As illustrated in diagram 500, a CIR estimate 501 may include a plurality of estimated sequences 503, where each sequence may include a plurality of complex values (e.g., including real and imaginary values) distributed over the CIR estimate 501. Each estimated sequence 503 may be associated with a signal phase 505, for example, phase-0, phase-1, phase-2, phase-3, phase-4, phase-5 and/or the like. The six phases may be determined, for example, based on an oversampling factor of 1.5 and an up-sampling factor of M=4. Each signal-phase may be associated with an estimated sequence spanning over a symbol period with a time index of "n", which may be preceded by samples with a time index "n−1" and followed by samples with a time index "n+1". For example, each signal-phase may form a sequence of values, each sequence value having an index such as n−1, n, n+1, and the like. The sequence values having the same time index (e.g., time index n) may be at a same time index position within their respective sequences. In some example embodiments, the phase-0 may be determined by a synchronization process operating on the "SYNC" 151 portion of the data packet 150 shown in FIG. 1.

Referring to FIG. 1, in some example embodiments, the CIR estimator-generator 121 may estimate, in parallel and at a symbol rate (e.g., 1/T), two CIR sequences. The two CIR estimated sequences may have two different signal phases, which may be separated in time by one half of the symbol period, T/2. In some example embodiments, some operations of the CIR estimator-generator 121 may be performed at the sampling rate 117, $[(M/N)f_s]$, whereas other operations may be performed at a sampling rate 122, (1/T). For example, the input signal 119 may be at the sampling rate 117, while an output signal 131 may be at the sampling rate 122. In some example embodiments, the CIR estimator-generator 121, based on a control signal 125 (e.g., a multibit signal) received from the phase selection logic 123, may perform one or more operations on the signal 119. For example, the CIR estimator-generator 121, based on the control signal 125, may generate an intermediate phase CIR estimate by interpolating (e.g., linear, polynomial, spline) two estimated sequences having two signal phases that are provided by the signal 119. The phase selection logic 123 may receive CIR characteristics 124 from the CIR estimator-generator 121 and determine, based on the characteristics 124, the signal-phase and the CIR estimate 131 for equalization.

Figure 6:
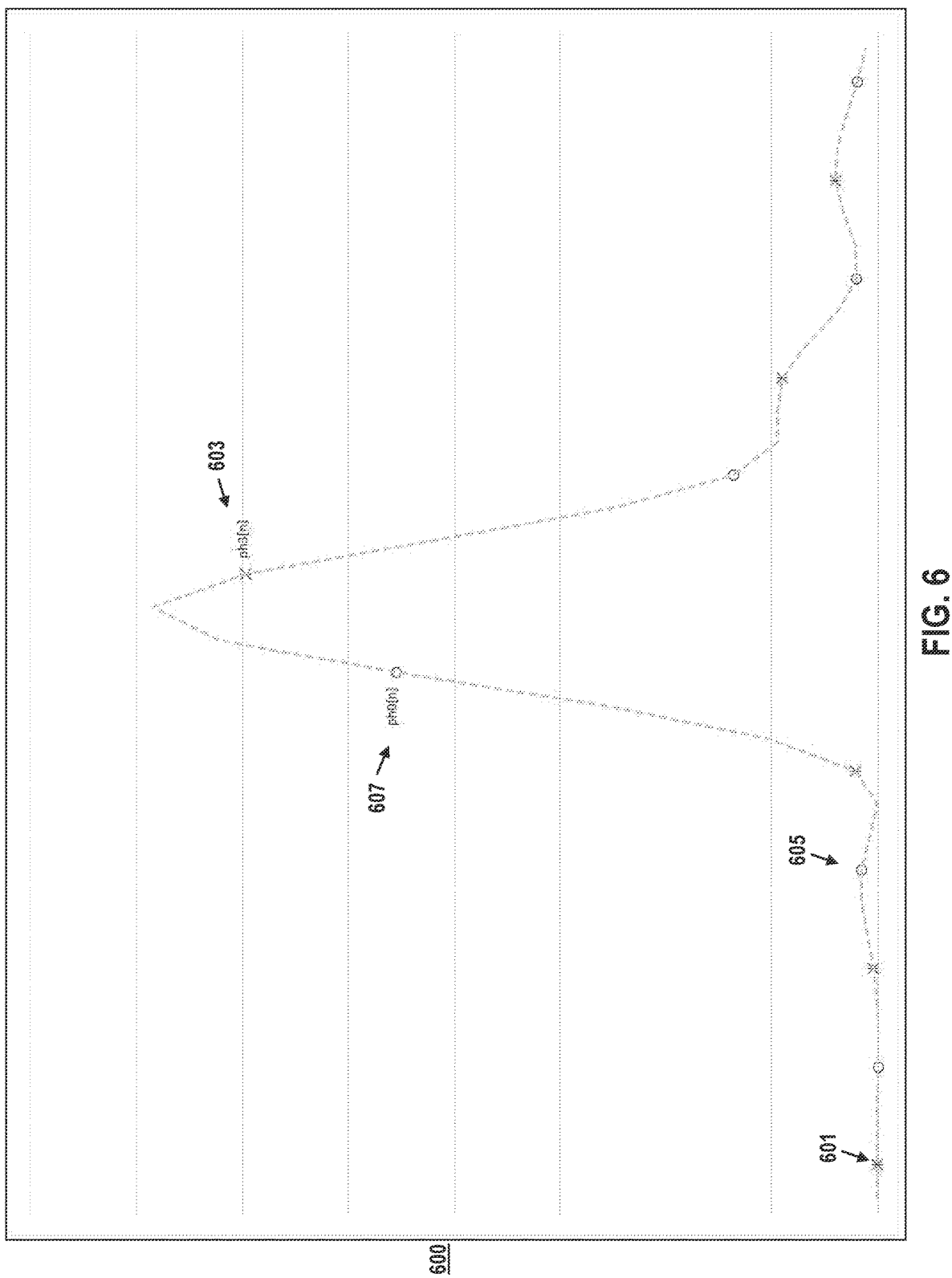
FIG. 6 depicts a plot of channel impulse response estimated sequences and signal-phases, in accordance with some example embodiments.
Figure 7:
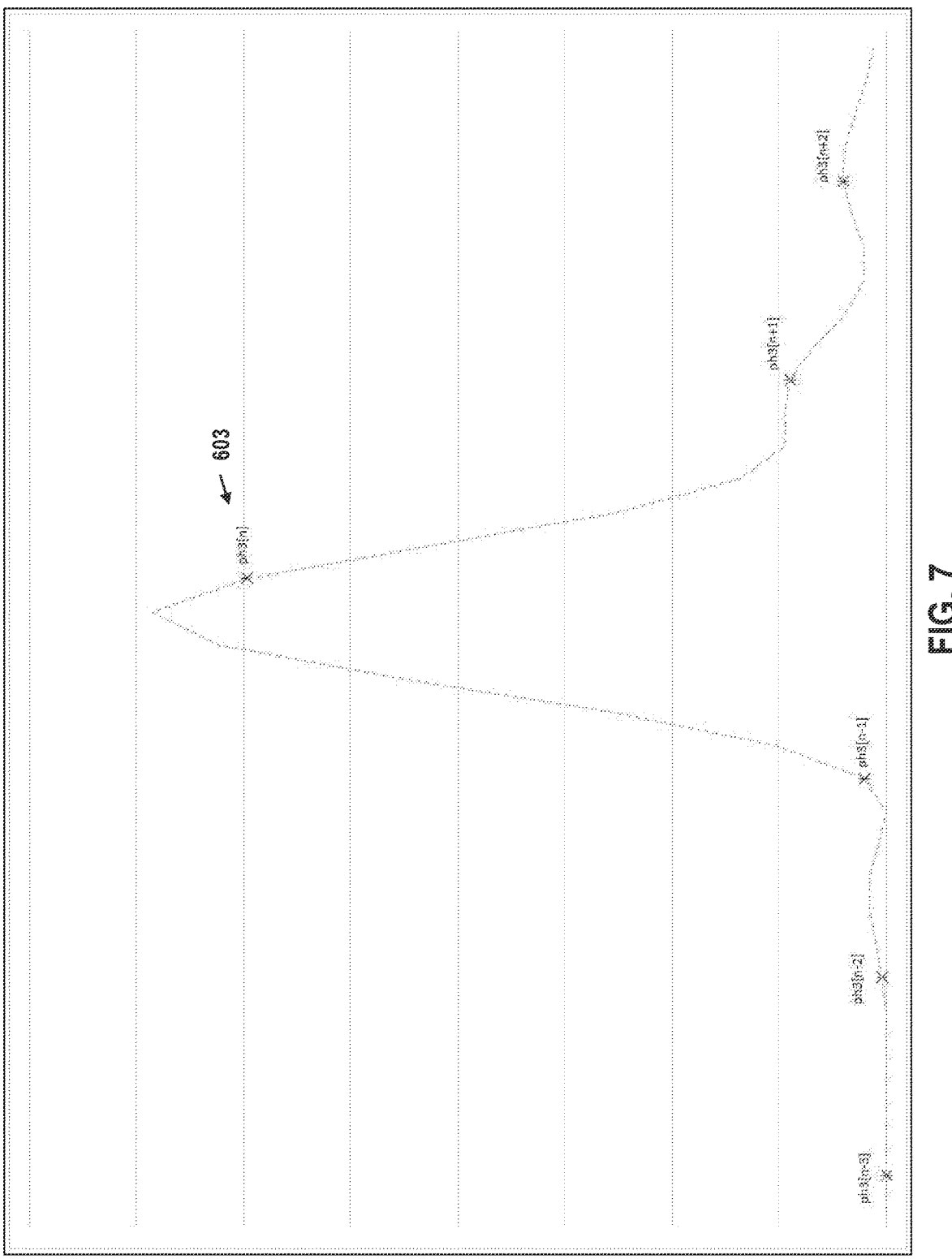
FIG. 7 depicts a plot of channel impulse response estimated sequence and signal-phase, in accordance with some example embodiments.

FIG. 6 depicts plot 600 of CIR estimated sequences and signal phases, in accordance with some example embodiments. In some example embodiments, a first estimated sequence may include sequence values 601 and 603 for one phase (e.g., phase-3), and a second estimated sequence may include sequence values 605 and 607 for another phase (e.g., phase-0). The sequence values 601, 603, 605, and 607 may be vector magnitudes (e.g., Euclidean norm), which may be used to determine the maximum value of each sequence. Alternatively, the maximum values may be based on the square of the vector magnitudes. For example, based on the maximum values 607 of phase-0, and 603 of phase-3, the estimated sequence having the signal phase-3 and the maximum value 603 may determine the signal-phase selection such that phase-3 of the signal may be selected for symbol-spaced equalization of the "HEADER" 155 and "PAYLOAD" 157 in the data packet 150 in FIG. 1. As illustrated in FIG. 7, the phase-3 CIR estimate sample sequence including the maximum value 603 may be used by the symbol-spaced equalizer 135 to generate equalization coefficients for equalizing the "HEADER" 155 and "PAYLOAD" 157 symbols.

Figure 8:
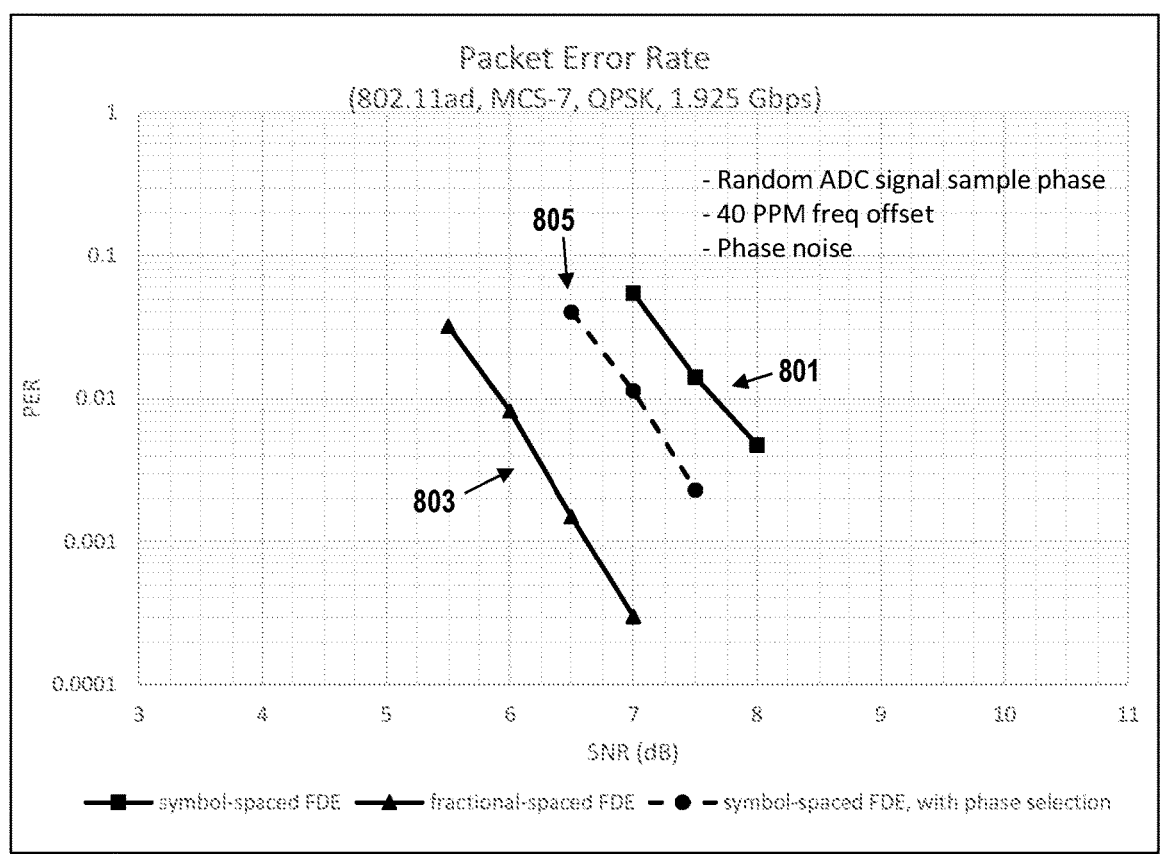
FIG. 8 depicts a plot of simulated packet error rate data, in accordance with some example embodiments.

FIG. 8 depicts a plot of simulated packet error rate data, in accordance with some example embodiments. Diagram 800 illustrates data points 801, which may be based on a random signal-phase and a symbol-spaced frequency domain equalizer. Data points 803 may be based on a fractionally-spaced frequency domain equalizer with two samples per symbol. Data points 805 may be based on a symbol-spaced frequency domain equalizer, which may include phase selection logic for selecting a signal phase and generating a channel impulse response.

The example data points in plot 800 of FIG. 8 may be generated based on simulations of 802.11ad data packets. Simulation conditions include the following parameters: ADC sampling rate, up-sampling factor, down-sampling factor, FIR coefficients and time-shift logic, payload length, and channel coding.

The following includes the communication channel effects applied to the above-noted simulation: Additive White Gaussian Noise (AWGN), frequency offset, phase noise, randomized ADC sampling phase, compression, and analog baseband filter distortion.

The example simulation is based on characteristics of two initial CIR estimates, such as the two sequences of phase-0 and phase-3 of FIG. 6, for phase selection decisions. One characteristic is the square of the Euclidean norm, which may be used to calculate the distance of the vector coordinate from the origin of the vector space for the peak value of each CIR estimate (MAX_NORM_HT_EST[0] and MAX_NORM_HT_EST[1]). Another characteristic is time index of the peak values (MAX_NORM_HT_IDX[0] and MAX_NORM_HT_IDX[1]). A time index may indicate that two or more values in the CIR estimate are aligned in time. For example, values having a time index of "n" may be aligned in time, or values having a time index of "n−1" may be aligned in time.

Table 1 below includes an example pseudo-code, which may be implemented in the phase selection logic 123. The signal processing decisions may be based on maximum values of the estimated OR sequences, the time indexes of the CIR maximum values, and threshold values.

```
// phase selection.
if((MAX NORM HT EST[1]>MAX NORM HT EST[0])&&(MAX NORM HT IDX[0]==MAX NORM HT I
DX[1])) {
    control_0 = 1; // select the late signal phase, select the late phase CIR
    select_0 = 0; // don't time shift the FILTER outputs
}
else if((MAX_NORM_HT_EST[1]>(THRESHOLD)) &&
(MAX_NORM_HT_IDX[0]==MAX_NORM_HT_IDX[1])) {
    control_0= 2; // select the early shifted signal phase, generate a new CIR
    select_0 = 1; // time shift the FILTER outputs by T/6
}
else {
    control_0= 0; // select the early signal phase, select the early phase CIR
    select_0= 0; // don't time shift the FILTER outputs
}
```

In some example embodiments, if control_0=1 and select_0=0, the odd (e.g., late, lagging) signal phase may be selected from a set of two initial signal phases output by the filter 111, and the OR estimate associated with that phase may be selected for symbol-spaced equalization. If control_0=0 and select_0=0, the even (e.g., early, leading) signal phase may be selected from the set of two initial phases, and the CIR estimate associated with that phase may be selected for symbol-spaced equalization within the equalizer 135. If control_0=2 and select_0=1, then an interpolated signal phase (e.g., shifted in time (⅙)T) may be selected, and a new channel impulse response may be generated (e.g., by an interpolation) from the two initial CIR estimates. In some example embodiments, the data points 805 may indicate an improvement in the performance of a symbol-spaced frequency domain equalizer, which may include the phase selection logic 123 for selecting a signal phase, compared to the performance of a symbol-spaced frequency domain equalizer, without the phase selection logic 123, associated with the data points 801.

Referring to FIG. 1, the CIR estimator-generator 121 may provide, to a symbol-spaced equalizer 135, an output signal 129 including signals 131 and/or 133. In some example embodiments, based on the control signal 125, the CIR estimator-generator 121 may provide a CIR estimate via the signal 131. For example, as illustrated in FIG. 6, based on the maximum values 607 of phase-0, and 603 of phase-3, the estimated sequence having the signal phase-3 and the maximum value 603 may be selected as the CIR estimate and provided in the signal 131. In some example embodiments, the CIR estimator-generator 121 may change a sampling rate (e.g., to a lower sampling rate of 1/T) of the data in the header field 155 and payload field 157 and provide the data, at the changed sampling rate, via the signal 133.

In some example embodiments, the symbol-spaced equalizer 135, based on the CIR estimated sequence corresponding to the selected signal phase, may generate equalization coefficients. The equalization coefficients may also be based on a known training sequence or decision-directed data, which may be included in the data packet 150. In some example embodiments, the symbol-spaced equalizer 135 may include coefficient generation criteria, such as zero-forcing (ZF) or minimum mean-squared error (MMSE), that may be calculated once or recursively. The coefficients may be calculated once and applied for a specific duration of time such as for the duration of receiving one data packet or may be calculated adaptively with various update periods. Iterative methods of coefficient generation may be based on, for example, recursive-least-squares or least-mean-squares algorithms. In some example embodiments, the phase selection logic 123 may determine that an initial signal phase of the signal 119 is the best signal phase. However, the phase selection logic 123 may also determine that the appropriate signal phase may be fractional relative to the initially available signal phase(s). In such a case, a fractional signal phase may be selected from a plurality of signal phases available within the filter 111. The fractional phase may be an intermediate (e.g., interpolated) phase between two initially evaluated signal phases. In some example embodiments, the symbol-spaced equalizer 135 may convert (e.g., by Discrete Fourier Transform) the input 131 from the time domain to the frequency domain for generating the equalization coefficients. The symbol-spaced equalizer 135 may apply the equalization to one or more segments of the data packet 150 and signal 133 to produce an equalized signal. For example, the symbol-spaced equalizer may produce an equalized signal by applying the equalization to the header

155 and payload 157 data. The equalizer may output the equalized signal to one or more downstream signal processing stages. The one or more downstream signal processing stages may include a symbol detector, a symbol demodulator, a symbol decoder, an error detection stage, an error correction stage, and/or the like. In some example embodiments, the symbol-spaced equalizer 135, based on a control signal 137 (e.g., a multibit signal) received from the phase selection logic 123, may perform one or more operations on the input signal 129. For example, the symbol-spaced equalizer 135 may shift the input signal 129 (e.g., shift by (⅙)T) in the frequency domain.

Figure 9:
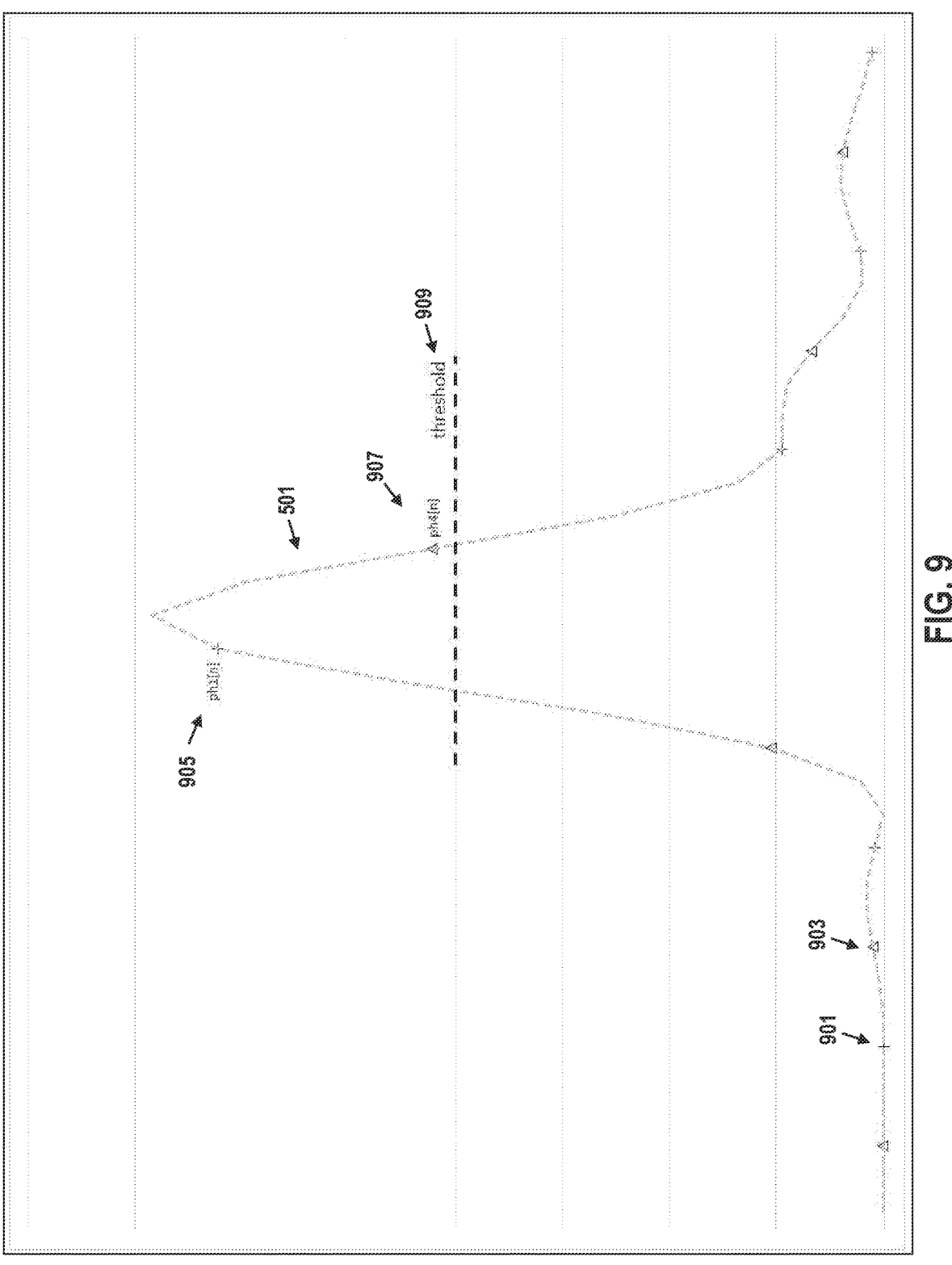
FIG. 9 depicts a plot of channel impulse response estimated sequences and signal-phases, in accordance with some example embodiments.

FIG. 9 depicts a plot of CIR estimated sequences and signal phases, in accordance with some example embodiments. As illustrated, the CIR response 501 may include estimated sequences 901 and 903 having maximum values 905 and 907, respectively. In some example embodiments, the phase selection logic 123, based on the maximum values 905 and/or 907, may generate a threshold value 909. For example, the threshold value 909 may be based on a percentage of the magnitude of the first maximum value 905 of the early phase, phase-1. Alternatively, the threshold value 909 may be based on the second maximum value 907 of the late phase, phase-4. In some example embodiments, a first set of threshold values may be determined based on the first maximum value 905 being equal to or greater than the second maximum value 907. A second set of threshold values may be determined based on the first maximum value 905 being less than the second maximum value 907. The first set of threshold values and/or second set of threshold values may include one or more threshold values. The threshold value 909 may be a fixed value or a processor programmable value using a hardware register such as a memory-mapped register (MMR) in the system 100. In some example embodiments, rather than selecting the signal phase associated with the OR estimated sequence having a greater maximum value such as 905, the phase selection logic 123 may compare the maximum values 905 of phase-1, and 907 of phase-4, to the threshold value 909 and select an intermediate phase (e.g., phase-2 or phase-3). In some example embodiments, if the maximum values 905 and 907 have the same time index value (e.g., "n", "n−1", etc.) and are greater than the threshold value 909, the phase selection logic 123 may cause the filter 111 to generate an intermediate signal phase. For example, the filter 111 may shift the output signal 113 by (⅙)T.

Figure 10:
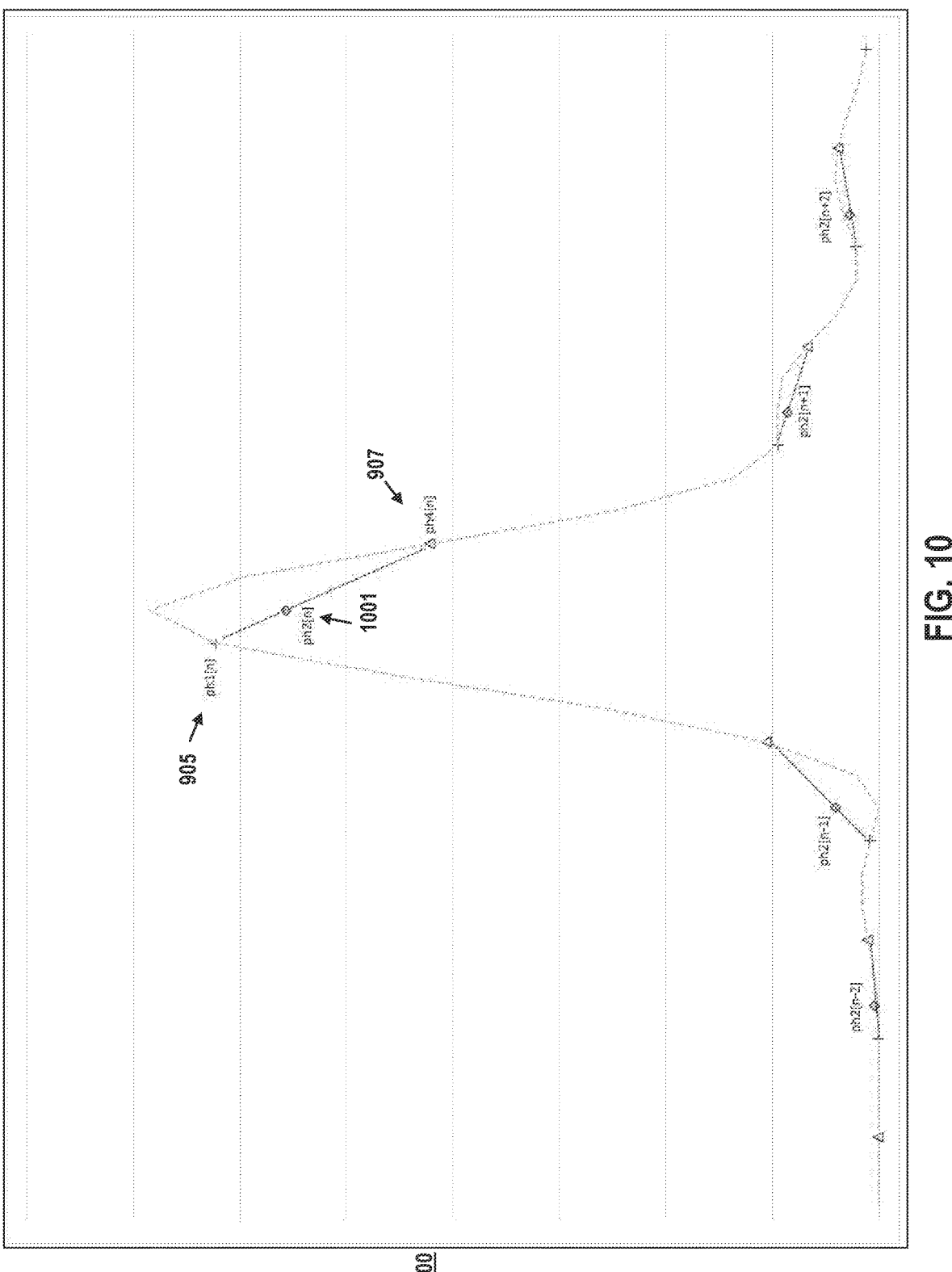
FIG. 10 depicts plots of channel impulse response estimated sequences and signal-phases, in accordance with some example embodiments.
Figure 10:
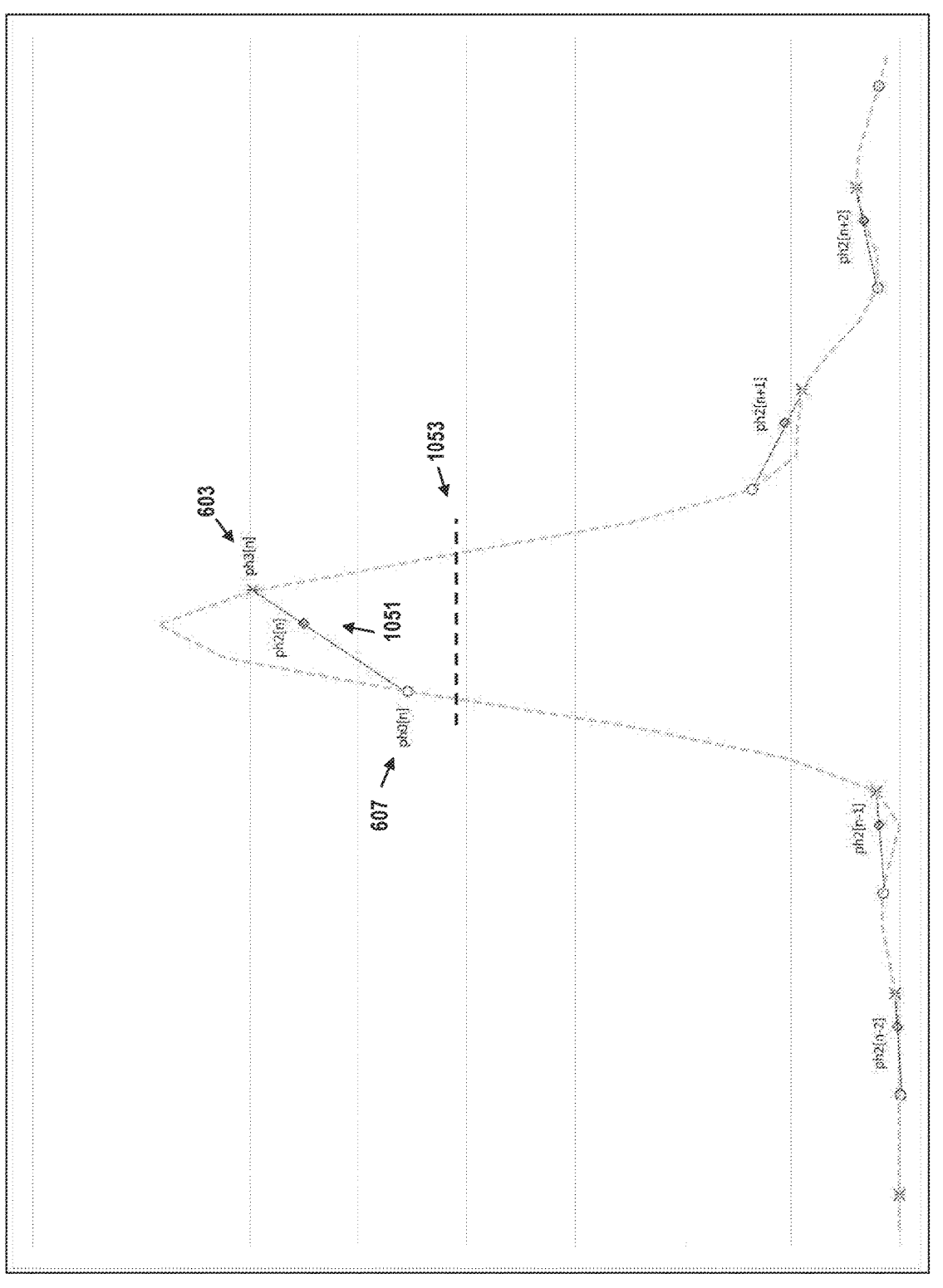

FIG. 10 depicts plots 1000 and 1050 of CIR estimated sequences and signal phases, in accordance with some example embodiments. In some example embodiments, the phase selection logic 123 may request for the CIR estimator-generator 121 to generate a third CIR estimated sequence intermediate to two current CIR estimated sequences. For example, as illustrated in the diagram 1000, the CIR estimator-generator 121 may generate an intermediate CIR estimated sequence with a maximum value 1001, which may be associated with a different phase, for example, phase-2. In some example embodiments, the intermediate CIR estimated sequence may be generated, for example, by linear interpolation between the two existing sequences having the maximum values of 905 and 907. The intermediate CIR estimated sequence may be forwarded to the symbol-spaced equalizer 135 for generating equalizer coefficients.

As illustrated in the diagram 1050, an intermediate CIR estimated sequence, of phase-2, having a maximum value 1051 may be generated by linear interpolation between two existing CIR estimated sequences having maximum values 603 and 607. In some example embodiments, when the maximum value 603 of a late phase (e.g., phase-3) is greater than the maximum value 607 of an early phase (e.g., phase-0), the phase selection logic 123 may calculate a threshold value 1053 to determine if an intermediate CIR estimated sequence should be generated and/or selected.

Figure 11:
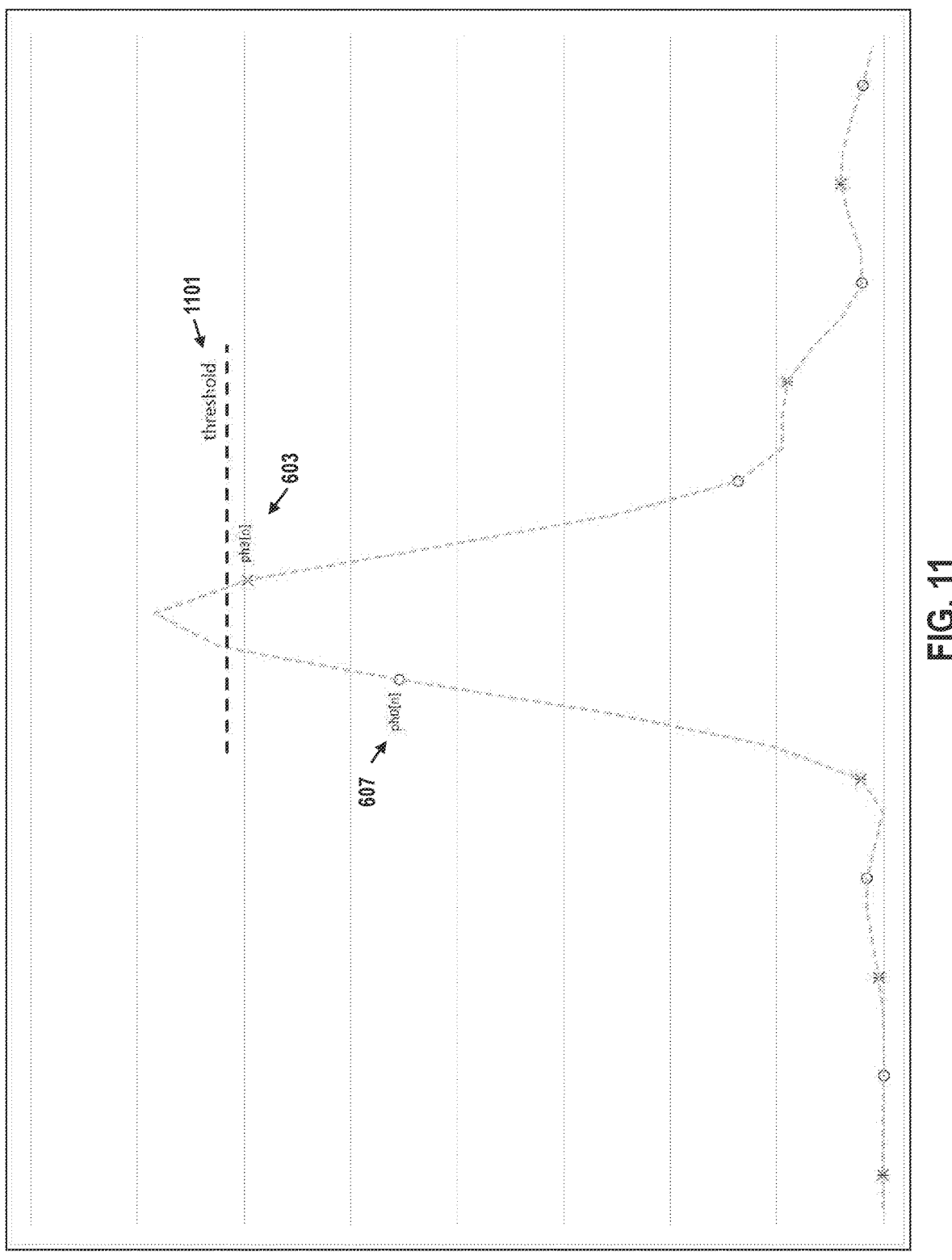
FIG. 11 depicts a plot of channel impulse response estimated sequences and signal-phases, in accordance with some example embodiments.

FIG. 11 depicts plot 1100 of CIR estimated sequences and signal phases, in accordance with some example embodiments. As illustrated, a late phase maximum value 603 may be greater than an early phase maximum value 607; however, the late phase maximum value 603 may be less than a threshold value 1101. In some example embodiments, the phase selection logic 123 may request, via the control signal 125, for the CIR estimator-generator 121 to generate an intermediate OR estimated sequence, which may be based on the currently available CIR estimated sequences having the maximum values 603 and 607.

While this specification contains many specifics, these should not be construed as limitations on the scope of what may be claimed or of what may be claimed, but rather as descriptions of features specific to particular implementations or embodiments. Certain features that are described in this specification in the context of separate implementations may also be implemented in combination in a single implementation. Conversely, various features that are described in the context of a single implementation may also be implemented in multiple implementations or embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications, and enhancements to the described examples and implementations and other implementations may be made based on what may be disclosed.

FIG. 12 depicts a block diagram illustrating a computing system 1200 consistent with some implementations of the current subject matter. The computing system 1200 may implement, for example, the system 100 and/or any components therein.

As shown in FIG. 12, the computing system 1200 may include a processor 1210, a memory 1220, a storage device 1230, and input/output devices 1240. The processor 1210, the memory 1220, the storage device 1230, and the input/output devices 1240 can be interconnected via a system bus 1250. The processor 1210 is capable of processing instructions for execution within the computing system 1200. Such executed instructions can implement one or more components of, for example. In some example embodiments, the processor 1210 can be a single-threaded processor. Alternately, the processor 1210 can be a multi-threaded processor. The processor 1210 is capable of processing instructions stored in the memory 1220 and/or on the storage device 1230 to display graphical information for a user interface provided via the input/output device 1240.

The memory 1220 is a computer readable medium such as volatile or non-volatile that stores information within the computing system 1200. The memory 1220 can store data structures representing configuration object databases, for example. The storage device 1230 is capable of providing persistent storage for the computing system 1200. The storage device 1230 can be a floppy disk device, a hard disk device, a solid state disk device, a flash drive device, an optical disk device, or a tape device, or other suitable persistent storage means. The input/output device 1240 provides input/output operations for the computing system 1200. In some example embodiments, the input/output device 1240 includes a keyboard and/or pointing device. In various implementations, the input/output device 1240 includes a display unit for displaying graphical user interfaces.

According to some example embodiments, the input/output device 1240 may provide input/output operations for a network device. For example, the input/output device 1240 may include a radio interface (e.g., a receiver, a transmitter), Ethernet ports or other networking ports to communicate with one or more wired and/or wireless networks (e.g., a cellular network, a local area network (LAN), a wide area network (WAN), the Internet). In some example embodiments, the input/output device 1240 may be implemented in the system 100 and/or in a communication device (e.g., a wireless device) including the system 100. The input/output device 1240 may receive a signal (e.g., an analog signal) and provide that signal to the system 100 and/or other elements in the communication device for signal processing.

In some example embodiments, the computing system 1200 can be used to execute various interactive computer software applications that can be used for organization, analysis and/or storage of data in various formats. Alternatively, the computing system 1200 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1240. The user interface can be generated and presented to a user by the computing system 1200 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A signal processing system comprising:
an analog-to-digital (ADC) converter configured to sample an analog input signal and provide a data stream including one or more data packets;
a channel impulse response (CIR) estimator-generator configured to receive channel-estimation data for each of the one or more data packets, and generate a CIR estimate including a plurality of sequences each associated with a different signal phase of the sampled analog input signal, wherein each different signal phase is based on a product of an oversampling factor and an up-sampling factor, and the product is an integer value greater than two;
a phase selection logic configured to determine, based on CIR characteristics received from the CIR estimator-generator, a signal phase for equalization; and
a symbol-spaced equalizer configured to,
generate equalization coefficients based on one of the plurality of sequences of the CIR estimate which corresponds to the determined signal phase for equalization, and
output an equalized signal, based on the equalization coefficients, to one or more downstream processing stages.

2. The signal processing system of claim 1, wherein the ADC converter is configured to operate at a sampling rate, based on a frequency of a sampling clock signal, to generate a signal including digital samples representative of the analog input signal.

3. The signal processing system of claim 1, further comprising a filter configured to execute at least one of up-sampling of the sampled analog input signal, interpolation of the sampled analog input signal, or down-sampling of the sampled analog input signal.

4. The signal processing system of claim 3, further comprising a time-frequency offset compensator configured to apply a correction to a filtered signal received from the filter, to compensate for a frequency offset between a sampling clock signal and a transmitter of a wireless signal associated with the sampled analog input signal.

5. The signal processing system of claim 3, wherein the phase selection logic is configured to provide a control signal to the filter to request the filter to output at least one of a signal which is shifted in time or one or more specific signal phases.

6. The signal processing system of claim 1, wherein the CIR estimator-generator is configured to, based on a control signal received from the phase selection logic, generate an intermediate phase CIR interpolating two estimated sequences having two signal phases.

7. The signal processing system of claim 6, wherein the interpolation includes at least one of linear interpolation, polynomial interpolation, and spline interpolation.

8. The signal processing system of claim 1, wherein each of the one or more data packets includes a synchronization field, a channel estimation field, a header field, and a payload field.

9. The signal processing system of claim 1, wherein the symbol-spaced equalizer is configured to generate the equalization coefficients according to at least one of zero-forcing (ZF) coefficient generation criteria and minimum mean-squared error (MMSE) coefficient generation criteria.

10. The signal processing system of claim 1, wherein the symbol-spaced equalizer is configured to perform a shift of the equalized signal in a frequency domain.

11. A non-transitory computer readable medium configured to store instructions which, when executed by at least one processor, cause the at least one processor to perform a method including:

estimating, by a communication device based on a first signal phase in a plurality of signal phases associated with an input signal, a first channel impulse response, wherein the plurality of signal phases is based on a product of an oversampling factor and an up sampling factor, and the product is an integer value greater than two;

estimating, based on a second signal phase in the plurality of signal phases, a second channel impulse response;

selecting, based on at least one characteristic of the estimated first channel impulse response and the estimated second channel impulse response, a signal phase from the plurality of signal phases;

equalizing, based on the selected signal phase, the input signal to produce an equalized signal; and outputting, to a symbol detector, the equalized signal.

12. The non-transitory computer readable medium of claim 11, wherein the first channel impulse response estimate includes a first sequence of values, wherein the at least one characteristic of the first channel impulse response estimate includes a first maximum value of the first sequence of values, wherein the second channel impulse response estimate includes a second sequence of values, and wherein the at least one characteristic of the second channel impulse response estimate includes a second maximum value of the second sequence of values.

13. The non-transitory computer readable medium of claim 12, wherein each value in the first sequence of values is associated with a first sequence time index, and wherein each value in the second sequence of values is associated with a second sequence time index.

14. The non-transitory computer readable medium of claim 13, wherein the instructions cause the at least one processor to further perform:

determining, by the communication device, a first set of threshold values based on the first maximum value being equal to or greater than the second maximum value; and determining, by the communication device, a second set of threshold values based on the first maximum value being less than the second maximum value.

15. The non-transitory computer readable medium of claim 14, wherein the instructions cause the at least one processor to further perform:

selecting, by the communication device, at least one of the first signal phase, the second signal phase, and an intermediate signal phase from the plurality of signal phases, wherein the selection is based on the first maximum value, the second maximum value, the first sequence time index, the second sequence time index, and at least one of the first set of threshold values and the second set of threshold values.

16. The non-transitory computer readable medium of claim 12, wherein the instructions cause the at least one processor to further perform:

selecting the second signal phase as the signal phase based on the second maximum value being greater than the first maximum value.

17. The non-transitory computer readable medium of claim 12, wherein the instructions cause the at least one processor to further perform:

selecting the first signal phase as the signal phase based on the first maximum value being equal to or greater than the second maximum value.

18. The non-transitory computer readable medium of claim 12, wherein the first channel impulse response estimate includes a first sequence of values, wherein the second channel impulse response estimate includes a second sequence of values, wherein each value in the first sequence of values is associated with a first sequence time index, and wherein each value in the second sequence of values is associated with a second sequence time index.

19. A non-transitory computer readable medium configured to store instructions which, when executed by at least one processor, cause the at least one processor to perform a method including:

estimating, by a communication device based on a first signal phase in a plurality of signal phases associated with an input signal, a first channel impulse response;

estimating, based on a second signal phase in the plurality of signal phases, a second channel impulse response;

selecting, based on at least one characteristic of the estimated first channel impulse response and the estimated second channel impulse response, a signal phase from the plurality of signal phases, wherein the first channel impulse response estimate includes a first sequence of values, the at least one characteristic of the first channel impulse response estimate includes a first maximum value of the first sequence of values, the second channel impulse response estimate includes a second sequence of values, the at least one characteristic of the second channel impulse response estimate includes a second maximum value of the second sequence of values, each value in the first sequence of values is associated with a first sequence time index, and each value in the second sequence of values is associated with a second sequence time index;

generating, by the communication device, an interpolated sequence of values based on a first portion of the first channel impulse response estimate and a second portion of the second channel impulse response estimate, wherein the first portion and the second portion are based on at least one of the first maximum value, the second maximum value, the first sequence time index, and the second sequence time index;

selecting, by the communication device, the signal phase based on a third maximum value of the interpolated sequence of values;

generating, by the communication device, a third channel impulse response estimate by down sampling, based on the third maximum value, the interpolated sequence of values;

equalizing, based on the selected signal phase, the input signal to produce an equalized signal; and outputting, to a symbol detector, the equalized signal.

20. The non-transitory computer readable medium of claim 19, wherein the plurality of signal phases is based on a product of an oversampling factor and an up sampling factor, and wherein the product is an integer value greater than two.

* * * * *